May 26, 1931.   H. L. PROUT   1,806,984
VARIABLE SPEED TRANSMISSION

Filed April 16, 1930

Inventor
HERBERT L. PROUT by L. A. Paley
Atty.

Patented May 26, 1931

1,806,984

UNITED STATES PATENT OFFICE

HERBERT L. PROUT, OF VILLA PARK, ILLINOIS

VARIABLE SPEED TRANSMISSION

Application filed April 16, 1930. Serial No. 444,732.

This invention relates to mechanism for transmitting power, and has reference more particularly to a variable speed mechanism in which power is transmitted by means of frictional contact elements.

In many frictional variable speed transmissions heretofore proposed, the amount of power which can be transmitted is comparatively small since slippage of the frictional contact elements takes place for larger amounts of power. For handling large amounts of power, it has been necessary to construct a mechanism of large proportions at an excessive cost. Other variable speed transmissions have been exceedingly complicated and prove to have a high cost both of manufacture and of maintenance. Other types of frictional variable speed transmissions absorb a considerable amount of power so that the efficiency is low. Furthermore, all types of frictional variable speed transmissions heretofore devised provide a uniform pressure of the contact surfaces at all times so that slippage at peak loads is apt to take place. It is this slippage rather than the normal operation which causes most of the wear and tear of friction surfaces in transmissions of this type.

An object of this invention, therefore, is to provide a frictional variable speed transmission for the operation of various types of machinery, in which the pressure of the contact frictional surfaces automatically increases as the load increases, thus preventing all slippage and enabling a mechanism of small proportions and low cost to transmit comparatively large amounts of power; and conversely, when the machine is running under a light load, the pressure on friction surfaces will also be light, and the natural wear and tear reduced to a minimum.

Inasmuch as the power transmitted by a friction drive is dependent on, and proportional to the pressure between such friction surfaces, it is another object of the present invention to provide a machine in which a considerable pressure is obtained between the friction surfaces without bringing an undue load upon the other moving parts which would impair the efficiency of the machine.

Another object of the invention is to provide a frictional variable speed transmission which is very simple and rugged in construction and can be manufactured at a low cost.

A further object of the invention is to provide a variable speed transmission which will operate for long periods of time with a low maintenance cost and with a high efficiency in power transmitted; also to improve variable speed transmissions in other respects hereinafter specified and claimed.

Figure 1:
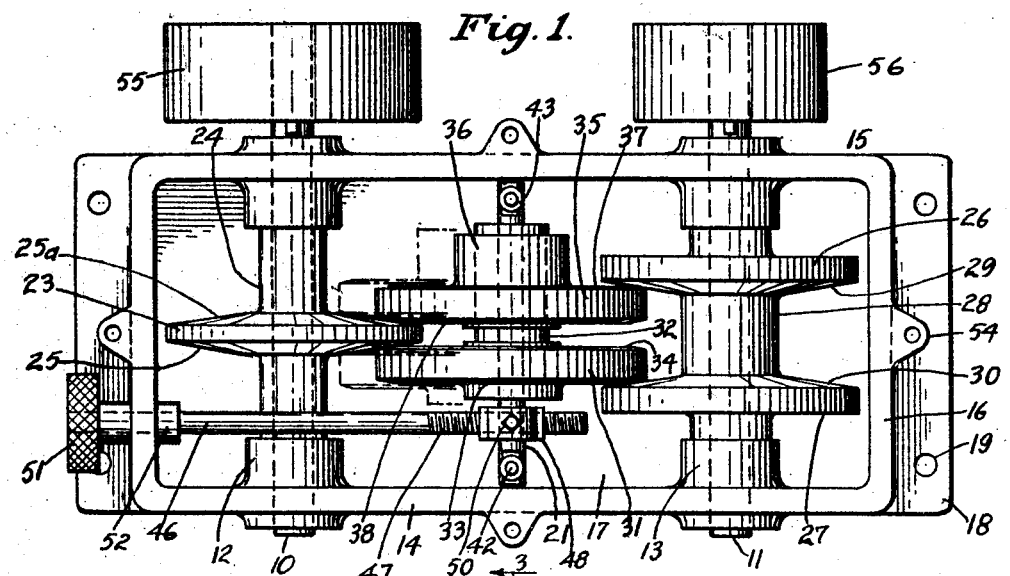
Figure 2:
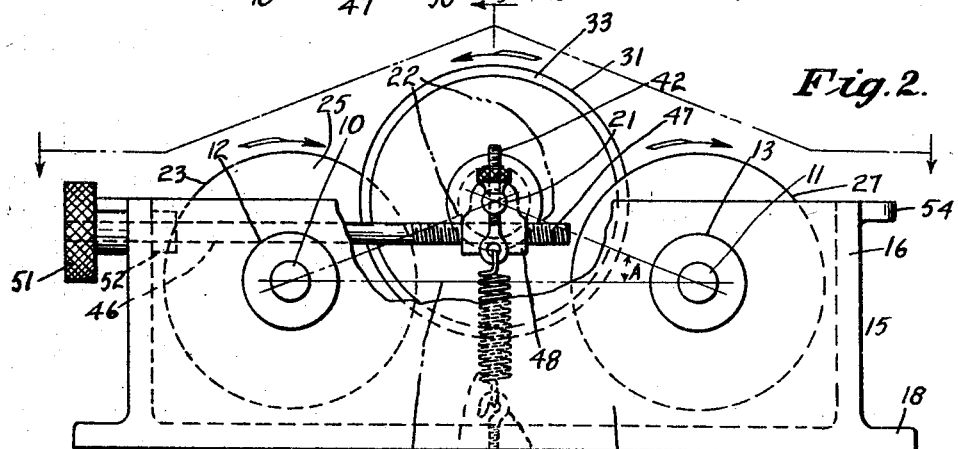

Reference is to be had to the accompanying drawings forming a part of this specification, in which Fig. 1 is a plan view of the mechanism taken on line 1—1 of Fig. 2.

Figure 3:
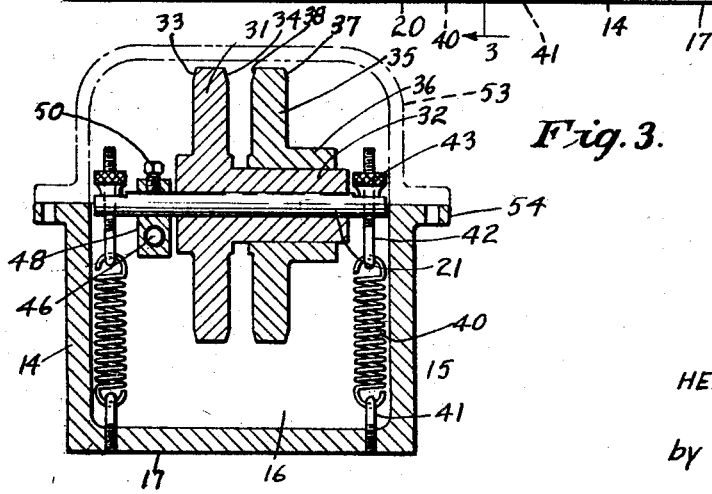

Fig. 2 is an elevation of the mechanism with cover removed and with parts broken away to disclose the construction, and Fig. 3 is a sectional elevation through the mechanism on line 3—3 of Fig. 2.

The variable speed mechanism consists essentially of a drive shaft 10 and a driven shaft 11, these shafts being rotatably supported in bearings 12 and 13 respectively. These bearings may be cast integrally with the side walls 14 of the container or case 15, as shown, or they may consist of separate flanged bushings bolted thereto. They may also be fitted with ball or roller bearings if desired. This container 15 is provided with end walls 16, a bottom 17, and outstanding flanges 18 formed at the bottom of said end walls for anchoring the container to a floor or base by means of bolts passing through bolt holes 19 formed in said flanges 18.

The shafts 10 and 11 are preferably arranged on a horizontal line 20. A third shaft 21 is arranged above and between the shafts 10 and 11 by devices to be hereinafter described. The center lines 22 connecting shaft 21 with the shafts 10 and 11, make an acute angle A which may vary from 0° up to 70°, the preferred value being about 20°. A drive friction wheel 23 is provided with an integral hub 24 which is rigidly secured by a key or other suitable means, to the shaft 10 between the bearings 12. Frusto-conical friction surfaces 25 and 25a are formed on the opposite faces of the friction wheel 23. A pair of driven friction wheels 26 and 27 is preferably integrally formed on a sleeve 28, the latter being secured concentrically on shaft 11 between bearings 13 by a key or other suitable means. The inner faces of wheels 26 and 27 are provided with frusto-conical friction surfaces 29 and 30 having the same face angle as surfaces 25a and 25 respectively. This face angle is preferably about 10° though it may be any angle greater or less than this amount. Friction wheel 23 may be greater or less diameter than friction wheels 26 and 27 if desired, to obtain a different speed ratio.

An idler friction wheel 31 is preferably integrally formed on a sleeve 32 which in turn is rotatably mounted upon shaft 21. One edge of wheel 31 has a beveled surface 33 which engages the friction surface 30, and the other edge of said wheel 31 has a beveled surface 34 which engages the friction surface 25. The wheel 31 is thus confined between friction surfaces 25 and 30 and thus prevented from any considerable axial movement along shaft 21. An idler friction wheel 35 is slidably mounted on sleeve 32 and is provided with an elongated hub 36 for distributing the bearing surface along sleeve 32. One edge of wheel 35 is provided with a beveled friction surface 37 which engages friction surface 29, and the other edge of said wheel 35 is provided with a beveled friction surface 38 which engages friction surface 25a. The wheel 35 is thus confined between friction surfaces 25a and 29 and prevented from any considerable axial movement on sleeve 32.

As the wheels 31 and 35 have no means of support other than their points of contact with wheels 23, 26 and 27, they tend to move downwardly under the action of gravity between shafts 10 and 11, with the result that wheels 35 and 31 become tightly wedged between wheels 26 and 27, and wheel 23 becomes tightly gripped between wheels 35 and 31, resulting in a considerable pressure between their respective friction surfaces. It is apparent that the smaller the face angle of conical friction wheels the greater will be the wedging action. Also it is apparent that this wedging action is further augmented by the toggle effect resulting from the smallness of the angle A (Fig. 2). That is, the smaller the toggle angle A, the greater will be the mechanical advantage. It is thus seen that a small downwardly acting force on shaft 21 will result in a considerable pressure between friction surfaces, due to the combined toggle and wedging actions.

In order to further increase the downward force on shaft 21, and supplement that due to gravity alone, I provide a pair of springs 40, each of which is connected at its lower end to the case bottom 17, as by a hook 41, and at its upper end to an eye bolt 42 which passes through the end of shaft 21. Thumb nuts 43 provide a means for adjusting the tension of said springs 40. The springs 40 also make it possible for the mechanism to be operated on end so that line 20 is vertical instead of horizontal.

However, it is not to be supposed that the transmitting power of the machine is entirely dependent upon the pressure furnished by springs 40, or that due to the weight of the wheels 31 and 35. In fact these forces are intended only to furnish the initial pressure; the main pressure being supplied by the driving force itself, through means which will now be described.

Referring to Fig. 2, it will be seen that drive shaft 10 is to be driven in a clockwise direction as indicated by the arrow. In transferring this motion to intermediate friction wheels 31 and 35, friction wheel 23 exerts a downwardly acting force upon them at the points of contact. Again, as intermediate wheels 31 and 35 seek to transfer their motion to driven wheels 26 and 27, the resistance to turning offered by these latter wheels also exerts a downward force on wheels 31 and 35 at the points of contact. Thus we have two downwardly acting forces at either side of wheels 31 and 35, with the result that they tend to move bodily downwardly between shafts 10 and 11. This movement, due to the toggle action of angle A, as explained above, tends to force the friction wheels into more intimate contact, thus increasing their driving power. It is possible to so apportion the magnitude of angle A that no driving force however great can cause the friction wheels to slip, but that they will transmit all power applied to them up to the limit of the breaking strength of the various parts.

In order the vary the speed of shaft 11 relative to shaft 10, I move the shaft 21 with its friction wheels 31 and 35, on a line approximately parallel to the line 20, but actually along a line which is slightly curved or elliptical. This movement of shaft 21 may be accomplished in any suitable way such as by a rod 46 having a threaded section 47 which engages a guide block 48. The upper part of block 48 has an opening through which the shaft 21 passes. The shaft 21 is preferably but not necessarily rigidly secured to the block 48 by means of a set bolt 50. The rod 46 passes loosely outwardly through one of the end walls 16 and is provided outside with a hand wheel 51. A locking collar 52 is secured to the rod 46 inside the end wall 16 so as to prevent axial movement of said rod 46. Thus, when the rod 46 is manually rotated, the friction wheels are moved longitudinally of the container 15 so that the speed ratio between shafts 10 and 11 is changed by reason of the varying radii of the points of contact between beveled wheels 31 and 35 with the conical friction surfaces 25, 25a, 29 and 30. One such secondary position of the friction wheels 31 and 35 is shown by dot and dash lines in Fig. 1. The beveled friction surfaces 33, 34, 37 and 38 are preferably slightly curved in cross-section so as to make a single point contact with the friction surfaces on wheels 23, 26 and 27.

It should be noted that bevel wheels 31 and and 35 have a slight axial movement toward or away from each other as they are being moved longitudinally over the conical friction surfaces; provision for this movement has been made on shaft 21, and on sleeve 32. There will be a considerable bending stress set up in sleeve 32, and it should be designed with sufficient strength to withstand this strain; this bending strain however is not transmitted to shaft 21, and the bevel wheels are free to revolve on this shaft at all times.

It should be noted here that the inner beveled surfaces 34 and 38 need not necessarily be of the same diameter as the outer beveled surfaces 33 and 37, for in this way a change in the speed ratios may be effected, if desired.

A cover 53 is provided over the container 15, secured to outstanding lugs 54 on said container, so that the container may be partly filled with oil, if desired, for lubrication of the moving parts. The shaft 10 is provided with a pulley 55 outside the container for applying the power, and shaft 11 is provided with a pulley 56 for taking off the power. Gears, sprockets or other power devices may be substituted for pulleys 55 and 56.

Should the idler wheels 31 and 35 exhibit a tendency in operation to be thrown upwardly momentarily, or to be unsteady in their frictional contact with wheels 23, 26 and 27, they may be restrained from such up and down movement by placing suitable guides above or below the ends of shaft 21. These guides should be slightly curved to allow for the curved path described by shaft 21. Said guides may be adjustable and secured to the inside of the case 15. They may be used either in conjunction with springs 40, or springs 40 may be dispensed with entirely.

While in this description the shaft 10 has been considered the driving or constant speed shaft, and shaft 11 the driven or variable speed shaft, it will be apparent that this order may be reversed, and shaft 11 become the driving shaft if desired; but it must then be driven in the opposite direction to that shown by the arrows. As this mechanism is designed preferably to rotate in one direction only, a reversing clutch may be attached to the driven shaft 11 if desired, thus permitting the direction of rotation of the driven machine to be reversed at will.

I would state in conclusion, that while the above described examples constitute practical embodiments of my invention, I do not wish to limit myself precisely to these details, since manifestly, the same may be considerably varied without departing from the spirit of the invention as defined in the appended claims.

Having thus described my invention, I claim as new and desire to secure by Letters Patent:

1. In a power transmitting mechanism, a driving shaft, a driven shaft extending substantially parallel thereto, a friction wheel secured to said driving shaft, said wheel having conical friction surfaces formed on its outer faces, a pair of friction wheels secured to said driven shaft and having conical, friction surfaces formed on their inner faces, a pair of idler power transmitting friction wheels mounted in parallel relation between said driving and driven shafts, and having beveled friction surfaces adapted to engage the surfaces of said driving and driven friction wheels, and means for moving said idler wheels over the faces of said driving and driven friction wheels so as to vary the speed ratio between said driving and driven wheels.

2. In a power transmitting mechanism, a driving shaft, a driven shaft extending parallel thereto, friction wheels having conical friction surfaces, said wheels being mounted on said shafts, a pair of idler, power transmitting, friction wheels having beveled friction surfaces formed on the faces of said wheels, one of said idler wheels being slidably mounted on an elongated hub protruding from the other of said idler wheels, so as to maintain said idler wheels in parallel relation at all times but permitting considerable, independent, axial movement of said idler wheels, said idler wheels being mounted for frictional engagement with said driving and driven friction wheels, and means for moving said idler wheels so as to vary the speed ratio between said driving and driven shafts.

3. In a power transmitting mechanism, a driving shaft, a driven shaft extending parallel thereto, friction wheels having conical friction surfaces, said wheels being mounted on said shafts, a pair of power transmitting, floating, friction wheels having beveled friction surfaces on the faces thereof, said floating wheels being mounted above and between said driving and driven friction wheels and supported solely by their points of engagement with said friction wheels, and means for moving said floating friction wheels over the faces of said driving and driven friction wheels so as to vary the speed ratio between said driving and driven shafts.

4. In a power transmitting mechanism, a driving shaft, a driven shaft, friction wheels secured to said shafts, rotatably mounted, power transmitting, floating friction wheels contacting with said wheels, the axis of said floating wheels being positioned at a toggle angle relative to the center line between said shafts, spring means for urging said floating wheels downwardly between said shafts to decrease said toggle angle and cause pressure between said contact surfaces, and means for varying the relative positions of said floating wheels so as to vary the speed ratio between said shafts.

5. In a power transmitting mechanism, a driving shaft, a driven shaft, friction wheels having friction surfaces, said wheels being secured to said shafts, power transmitting floating friction wheels rotatably mounted between and above said shafts for yielding vertical movement, said floating wheels having beveled friction surfaces for engaging the wheels on said shafts, said floating wheels being drawn downwardly between said shafts by the tangential forces being transmitted, so as to automatically build up the pressure between friction surfaces only when revolving in the proper direction, and means for moving said floating wheels so as to vary the speed ratio between said shafts.

6. In a power transmitting mechanism, a driving shaft, a driving friction wheel secured to said shaft, said wheel having friction surfaces, a driven shaft, a pair of driven friction wheels secured thereto in spaced parallel relation and having friction surfaces, a pair of power transmitting, floating idler wheels having friction surfaces and elongated hubs, and contacting with said driving and driven friction wheels, all of said wheels rotating in substantially parallel planes at all times, all friction surfaces on said wheels being substantially frusto-conical in shape and with face angles adapted to secure a maximum of pressure between said friction surfaces, and means for adjusting the position of said idler wheels so as to vary the speed ratio between said driving and driven shafts.

7. In a power transmitting mechanism, a driving shaft, a driven shaft in fixed, parallel relation thereto, friction wheels secured to said shafts, a sleeve floatably mounted above and between said shafts, an idler friction wheel rigidly secured to said sleeve, a second idler friction wheel slidably mounted on said sleeve, beveled friction surfaces formed on both sides of said idler wheels for power transmission, said inner beveled sides engaging the friction wheel on the drive shaft, and said outer beveled sides engaging the friction wheels on said driven shaft, so as to create a balanced condition, the pressure at each of the four points of frictional contact being equalized at all times, and means for changing the position of said idler wheels so as to effect a change of speed ratio between said driving and driven shafts.

8. In a power transmitting mechanism, a driving shaft, a driven shaft, friction wheels secured to said shafts, a sleeve floatably mounted above and between said shafts, an idler friction wheel rigidly secured to said sleeve, a second idler friction wheel slidably mounted on said sleeve, all of said wheels being in power transmitting relation, a shaft passing loosely through the center of said sleeve, spring means attached to each end of said shaft, means for adjusting the tension of said spring means to obtain a constant resilient pressure between said friction wheels, and means for moving said idler wheels to vary the speed ratio between said driving and driven shafts.

9. In a power transmitting mechanism, a driving shaft, a driven shaft, friction wheels secured to said shafts, a sleeve floatably mounted above and between said shafts, an idler friction wheel rigidly secured to said sleeve, a second idler friction wheel slidably mounted on said sleeve, all of said wheels being in power transmitting relation, a shaft passing loosely through the center of said sleeve, a block secured to one end of said shaft, and a threaded rod passing through said block to provide adjusting means for changing the position of said idler wheels so as to effect a change in speed ratio between said driving and driven shafts.

HERBERT L. PROUT.